(12) United States Patent
Arakawa et al.

(10) Patent No.: US 7,902,790 B2
(45) Date of Patent: Mar. 8, 2011

(54) INDUCTION MOTOR DRIVE UNIT, MOTOR DRIVE SYSTEM, AND ELEVATING SYSTEM

(75) Inventors: Yoichiro Arakawa, Hitachi (JP);
Koichiro Nagata, Mito (JP); Hiroyuki Tomita, Funabashi (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 334 days.

(21) Appl. No.: 12/142,002

(22) Filed: Jun. 19, 2008

(65) Prior Publication Data
US 2008/0315824 A1 Dec. 25, 2008

(30) Foreign Application Priority Data
Jun. 19, 2007 (JP) ................. 2007-161864

(51) Int. Cl.
*H02P 21/14* (2006.01)
(52) U.S. Cl. ......... 318/800; 318/799; 318/807; 318/757; 318/400.3; 318/400.02
(58) Field of Classification Search ............. 318/400.02, 318/400.3, 800, 801, 807, 757, 799; 187/290, 187/295
See application file for complete search history.

(56) References Cited

U.S. PATENT DOCUMENTS

| | | | |
|---|---|---|---|
| 4,009,427 A | 2/1977 | Takahashi | |
| 4,473,786 A * | 9/1984 | Miyashita et al. | 318/561 |
| 4,544,873 A * | 10/1985 | Salihi et al. | 318/801 |
| 4,662,478 A * | 5/1987 | Uchino | 187/290 |
| 4,713,595 A * | 12/1987 | Yonemoto | 318/759 |
| 4,719,995 A | 1/1988 | Ikejima | |
| 4,818,927 A * | 4/1989 | Hino et al. | 318/798 |
| 4,855,661 A | 8/1989 | Okamoto | |
| 5,929,400 A * | 7/1999 | Colby et al. | 187/393 |
| 6,009,003 A * | 12/1999 | Yeo | 363/37 |
| 7,545,116 B2 * | 6/2009 | Nagata et al. | 318/807 |
| 2007/0210741 A1 * | 9/2007 | Nagata et al. | 318/807 |
| 2007/0227828 A1 * | 10/2007 | Kinpara et al. | 187/295 |
| 2008/0315824 A1 * | 12/2008 | Arakawa et al. | 318/800 |
| 2009/0251082 A1 * | 10/2009 | Kono et al. | 318/400.02 |
| 2010/0141188 A1 * | 6/2010 | Kakebayashi et al. | 318/400.3 |

FOREIGN PATENT DOCUMENTS

| | | |
|---|---|---|
| DE | 33 38 319 | 5/1985 |
| DE | 199 62 690 | 7/2001 |
| EP | 0 677 919 | 10/1995 |
| EP | 0 771 067 | 5/1997 |
| JP | 02-262893 | 10/1990 |
| JP | 10-023800 | 1/1998 |
| JP | 2007-244174 | 9/2007 |

* cited by examiner

*Primary Examiner* — Paul Ip
(74) *Attorney, Agent, or Firm* — Antonelli, Terry, Stout & Kraus, LLP.

(57) ABSTRACT

A slip frequency is estimated from a current instruction or detected currents in an induction motor. Acceleration impossibility in an induction motor drive unit is determined, when the slip frequency exceeds the maximum torque generating slip frequency for the predetermined interval or the time integrating result exceeds a predetermined value; when the q-axis magnetic flux exceeds the maximum torque generating q-axis magnetic flux or exceeds for a predetermined interval; when the estimated rotational speed is under a predetermined value; when the rotational speed variation rate is negative; and when the rotational speed instruction value or the estimated rotational speed is equal to or smaller than a predetermined value. An induction motor drive system and an elevating system including the induction motor drive unit are also disclosed.

13 Claims, 13 Drawing Sheets

INDUCTION MOTOR DRIVE UNIT, MOTOR DRIVE SYSTEM, AND ELEVATING SYSTEM

CROSS REFERENCE TO RELATED APPLICATIONS

This application claims the foreign priority benefit under Title 35, United States Code, §119(a)-(d) of Japanese Patent Application No. 2007-161864, filed on Jun. 19, 2007 in the Japan Patent Office, the disclosure of which is herein incorporated by reference in its entirety.

BACKGROUND OF THE INVENTION

1. Field of the Invention

The present invention relates to an induction motor drive unit, a motor drive system, and an elevating system.

2. Description of the Related Art

An elevating system including an induction motor is known. Lifting goods with the elevating system such as a crane requires protection technology. For example, an excessive slip in the induction motor caused by an acceleration rate of the induction motor which is higher than a value determined by the weight of the goods should be prevented. Further, falling of the goods caused by a load variation due to an excessive load, an unstable state of the goods, and vibrations should be prevented. In addition, variations in constants of the induction motor due to heat should be prevented.

JP 02-262893 A discloses that a slip frequency is obtained from a difference between a rotating speed detected with a rotational speed sensor and an input frequency (primary frequency). When the slip frequency exceeds a predetermined value, deceleration or stopping is done.

JP 3351244 discloses at paragraphs 0033 and 0036 a technology of vector-control which controls currents in an induction motor to obtain a maximum torque at a low rotational speed range. In this technology, a d-axis current requiring no polarity setting is increased, and a q-axis current is limited to a predetermined value or approximately zero.

SUMMARY OF THE INVENTION

A first aspect of the present invention provides an induction motor drive unit comprising: an electric power converter for driving an induction motor; a current detector for detecting currents in the induction motor; a drive circuit for generating a drive signal supplied to the electric power converter in response to a rotational frequency instruction and the currents; a slip frequency calculating unit for calculating a slip frequency of the induction motor from the currents and the rotational frequency instruction; a maximum torque generating slip frequency calculating unit for calculating a maximum torque generating slip frequency for generating a maximum torque of the induction motor from a value regarding the currents; and an acceleration impossibility determining unit for determining that acceleration of the induction motor is impossible when the slip frequency exceeds the maximum torque generating slip frequency for the predetermined time interval to generate an acceleration impossibility signal.

According to the first aspect, an erroneous detection of acceleration impossibility may be prevented.

A second aspect of the present invention provides an induction motor drive unit comprising: an electric power converter for driving an induction motor; a current detector for detecting currents in the induction motor; a drive circuit for generating a drive signal supplied to the electric power converter in response to a rotational frequency instruction and the currents; a slip frequency calculating unit for calculating a slip frequency of the induction motor from the currents and the rotational frequency instruction; a maximum torque generating slip frequency calculating unit for calculating a maximum torque generating slip frequency for generating a maximum torque of the induction motor from a value regarding the currents; an integrating unit for obtaining a difference frequency between the maximum torque generating slip frequency and the slip frequency and time-integrating the difference frequency for time interval while the maximum torque generating slip frequency exceeds the slip frequency; and an acceleration impossibility determining unit for determining that acceleration of the induction motor is impossible when the integrating result of the integrating unit exceeds the predetermined value to generate an acceleration impossibility signal.

According to the second aspect, although the slip frequency varies (increasing and decreasing), an erroneous detection of acceleration impossibility may be prevented.

A third aspect of the present invention provides an induction motor drive unit comprising: an electric power converter for driving an induction motor; a current detector for detecting currents in the induction motor; a drive circuit for generating a drive signal supplied to the electric power converter in response to a rotational frequency instruction and the currents; a q-axis magnetic flux calculating unit for calculating a q-axis magnetic flux of the induction motor from the currents and the rotational frequency instruction; a maximum torque generating q-axis magnetic flux calculating unit for calculating a maximum torque generating q-axis magnetic flux for generating a maximum torque of the induction motor from a value regarding the currents; and an acceleration impossibility determining unit for determining that acceleration of the induction motor is impossible when the q-axis magnetic flux exceeds the maximum torque generating q-axis magnetic flux to generate an acceleration impossibility signal.

In the third aspect, the q-axis magnetic flux may include a secondary q-axis magnetic flux.

A fourth aspect of the present invention provides an induction motor drive unit comprising: an electric power converter for driving an induction motor; a current detector for detecting currents in the induction motor; a drive circuit for generating a drive signal supplied to the electric power converter in response to a rotational frequency instruction and the currents; a q-axis magnetic flux calculating unit for calculating a q-axis magnetic flux of the induction motor from the currents and the rotational frequency instruction; a maximum torque generating q-axis magnetic flux calculating unit for calculating a maximum torque generating q-axis magnetic flux for generating a maximum torque of the induction motor from a value regarding the currents; and an acceleration impossibility determining unit for determining that acceleration of the induction motor is impossible when the q-axis magnetic flux exceeds the maximum torque generating q-axis magnetic flux for a predetermined time interval to generate an acceleration impossibility signal.

A fifth aspect of the present invention provides an induction motor drive unit comprising: a current detector for detecting currents in the induction motor; a drive circuit for generating a drive signal supplied to the electric power converter in response to a rotational frequency instruction and the currents; a q-axis magnetic flux calculating unit for calculating a q-axis magnetic flux of the induction motor from the currents and the rotational frequency instruction; a maximum torque generating q-axis magnetic flux calculating unit for calculating a maximum torque generating q-axis magnetic flux for generating a maximum torque of the induction motor from a value regarding the currents; an integrating unit for obtaining a difference magnetic flux between the maximum torque generating q-axis magnetic flux and time-integrating the difference magnetic flux while the q-axis magnetic flux exceeds the maximum torque generating q-axis magnetic flux; and an acceleration impossibility determining unit for determining that acceleration of the induction motor is impossible when the integrated difference magnetic flux exceeds the predetermined value to generate a acceleration impossibility signal.

A sixth aspect of the present invention provides an induction motor drive system comprising an induction motor; and the induction motor drive unit based on the first aspect, wherein the electric power converter is driven by a three-phase ac power source.

A seventh aspect of the present invention provides an elevating system comprising: the induction motor drive unit based on the first aspect; an induction motor driven by the electric power converter; and an elevating unit driven by the induction motor.

According to the seventh embodiment, falling down of the goods may be prevented.

An eighth aspect of the present invention provides an induction motor drive unit comprising: an electric power converter for driving an induction motor; a current detector for detecting currents in the induction motor; a drive circuit for generating a drive signal supplied to the electric power converter in response to a rotation instruction and the currents; a variable detecting unit for detecting a variable of the induction motor regarding a torque generated by the induction motor from the currents and the rotational frequency instruction; a maximum torque generating value calculating unit for calculating a maximum torque generating threshold regarding the variable for generating a maximum torque of the induction motor from a value regarding the currents; and an acceleration impossibility determining unit for determining that acceleration of the induction motor is impossible when the variable exceeds the maximum torque generating threshold to generate an acceleration impossibility signal.

The acceleration impossibility may be determined in which a maximum torque can be generated because the determination is made on the basis of the q-axis magnetic flux for generating a maximum torque or the estimated slip frequency.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing embodiments of the present invention, the above-mentioned related art will be further described.

In the technology disclosed by JP 02-262893 A, the induction motor may be decelerated or stopped without generating a maximum torque because this technology does not consider optimization of the slip frequency which is to be a reference for a deceleration or stopping control process of the induction motor.

The present invention provides an induction motor drive unit and a motor drive system capable of generating a torque close to an ideal maximum value in determining whether acceleration is possible or impossible. The present invention further provides an elevating system using the same.

First Embodiment

When goods are lifted with an elevating system such as a crane at an acceleration $\alpha$, a necessary torque $\tau m$ depends on the acceleration $\alpha$ and a weight of goods (a cargo, freight, or the like) as shown in Eq. (1).

$$M \cdot a \cdot r = J \cdot d\omega/dt = \tau m - m \cdot g \cdot r \quad (1)$$

where it is assumed that the goods are lifted by a pulley having a radius r, J is a total inertial moment including the induction motor and a mechanism (the pulley and the like), $\omega$ is a rotational speed of an induction motor, and m is a mass of the goods, and g is a gravity acceleration.

In this equation, a maximum value of the torque $\tau m$ depends on a capacity of the induction motor, wherein when $m \cdot g \cdot r$ is large as compared with the capacity, the acceleration $\alpha$ is negative or zero. This means that it is impossible to lift the goods. Further although the acceleration $\alpha$ is positive, if a rotational speed variation rate $d\omega^*/dt$ is higher than a maximum torque $\tau m$ max$-m \cdot g \cdot r)/J$, the induction motor cannot respond to an instruction signal, which results in failure in lifting.

Figure 1:
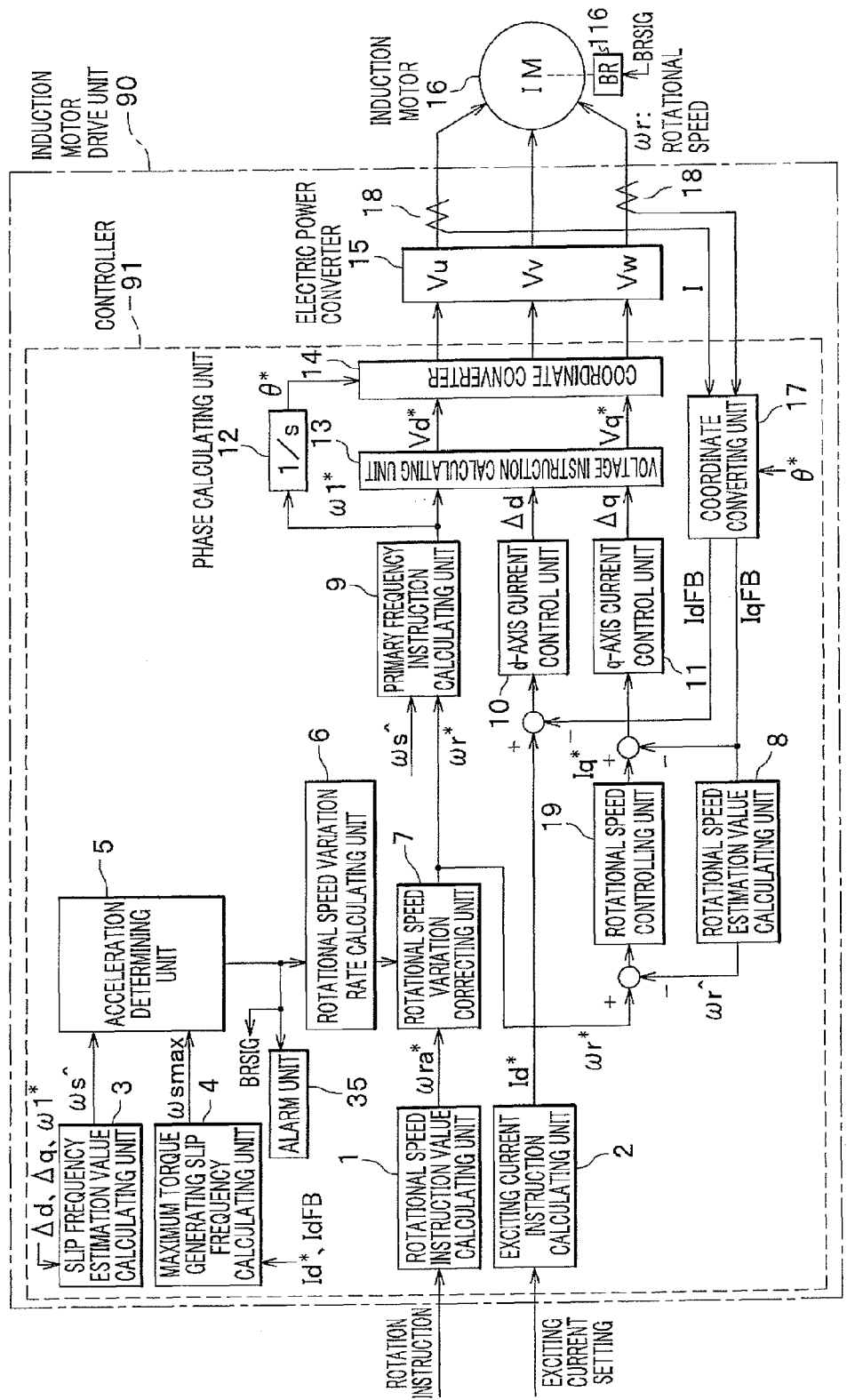
FIG. 1 is a block diagram of an induction motor drive system including an induction motor drive unit according to a first embodiment of the present invention.
Figure 10:
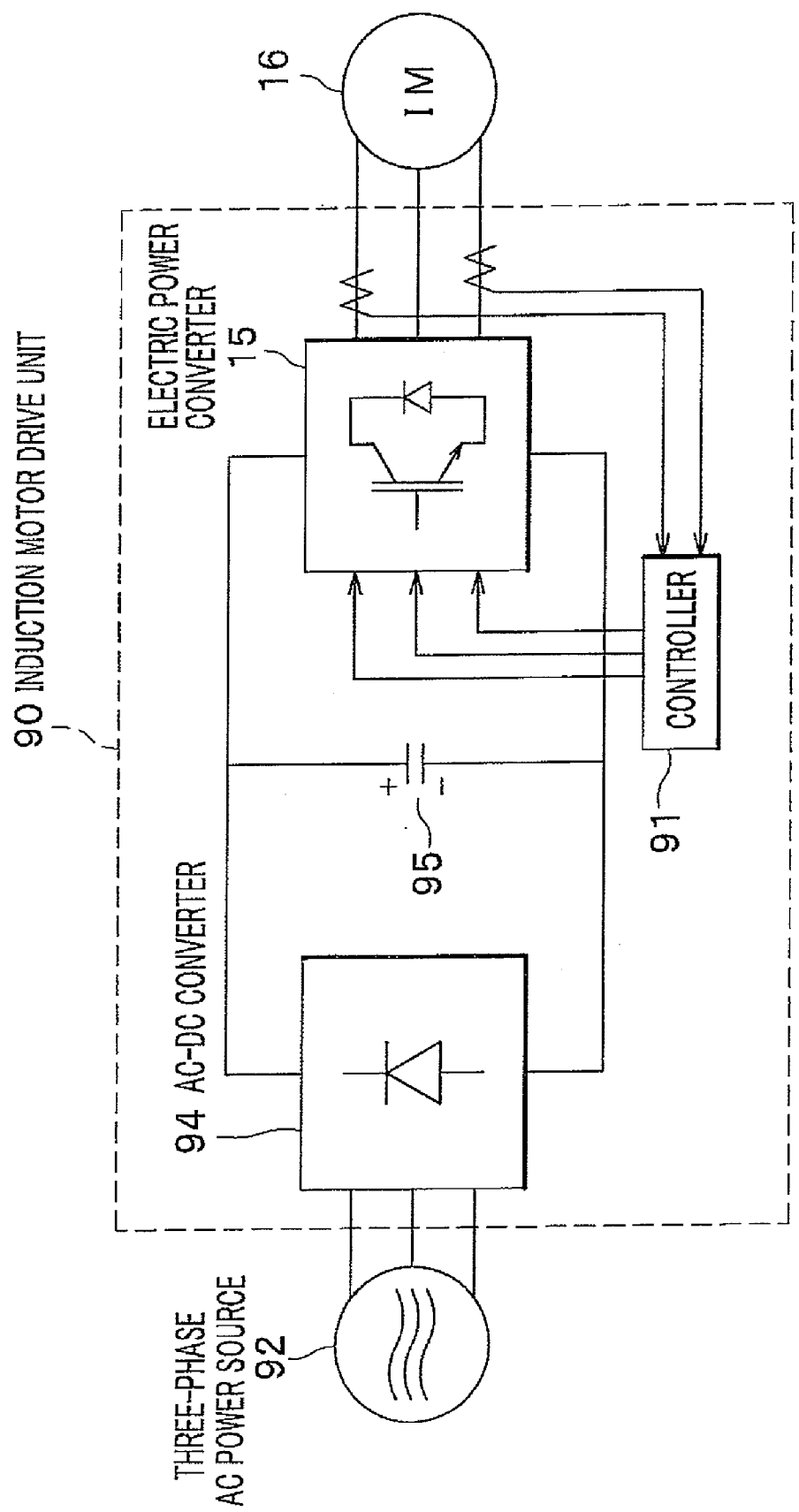
FIG. 10 is a block diagram for showing an ac power source connection for the first to eighth embodiments of the present invention.
Figure 11:
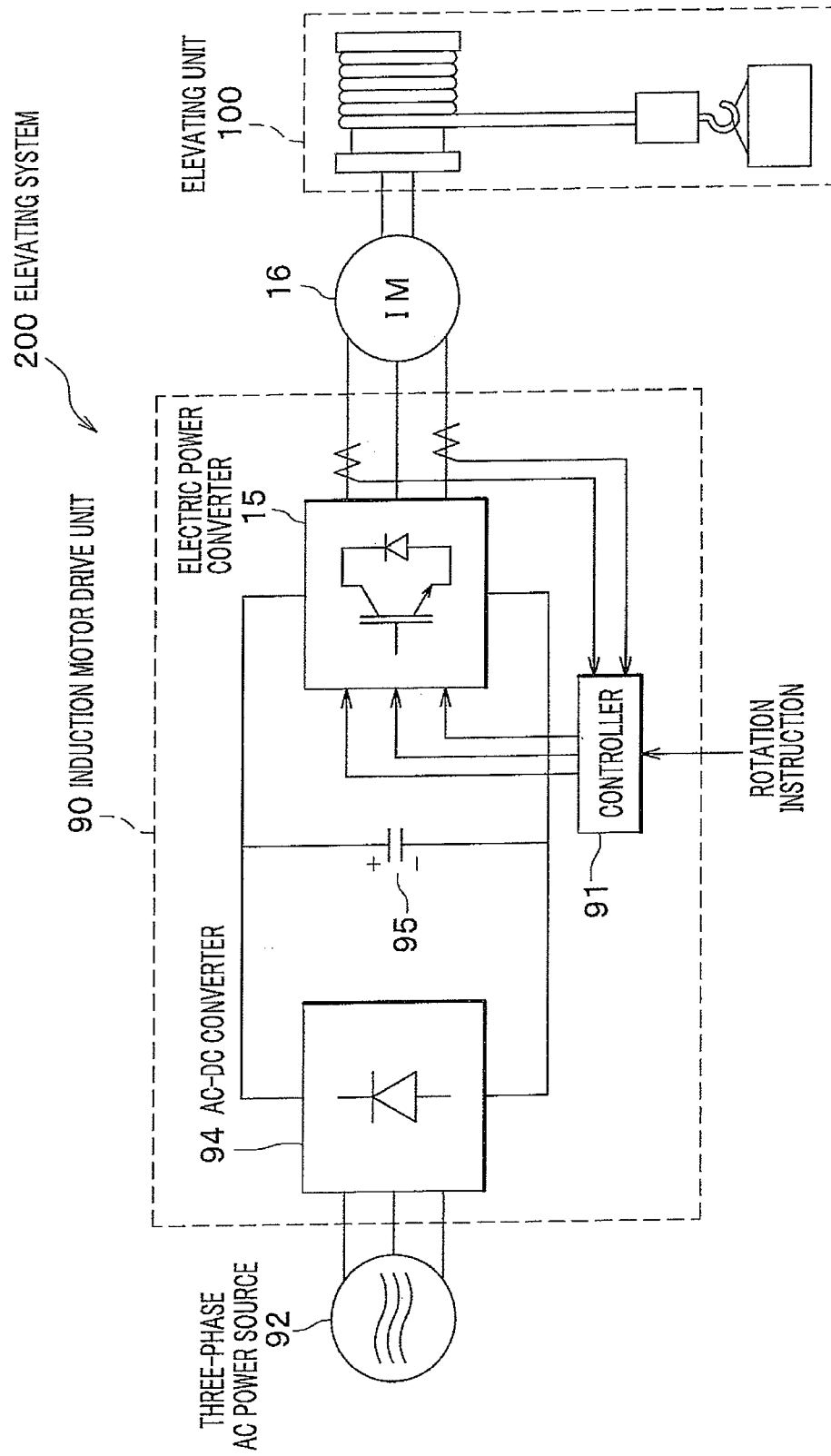
FIG. 11 is a block diagram for showing an elevating system according to a ninth embodiment, which system uses any of the induction motor drive systems in the first to eighth embodiments.

FIG. 1 shows a motor drive system of the first embodiment of the present invention. The motor drive system of the first embodiment has a control system of a rotational speed sensor less type in which a rotational speed of the induction motor 16 is not detected with any additional discrete sensor. The motor drive system includes an induction motor drive unit 90 and an induction motor 16. The induction motor drive unit 90 includes a controller 91, an electric power converter 15, and a current detector 18. The induction motor 16 rotates at a rotational speed ωr obtained by subtracting a slip frequency ωs from a frequency of thee-phase input voltage (primary frequency ω1). The electric power converter 15 includes a plurality of switching elements such as an IGBT (Insulated Gate Bipolar Transistor) to drive the induction motor 16 on the basis of PWM (Pulse Width Modulation) signal generated by the controller 91. The current detector 18 detects induction motor currents I flowing in the induction motor 16. More specifically the current detector 18 detects actual U-phase and W-phase currents flowing through the induction motor 16. In FIG. 1, a three-phase ac power source and an ac-dc converter are omitted which are shown in FIGS. 10 and 11 and designated as a three-phase ac power source 92 and an ac-dc current converter 94.

The controller 91 mainly includes a rotational speed instruction value calculating unit 1, an exciting current instruction calculating unit 2, a slip frequency estimation value calculating unit 3 which serves as a slip frequency calculating unit, a maximum torque generating slip frequency calculating unit 4, an acceleration determining unit 5, a rotational speed variation rate calculating unit 6, a rotational speed variation correcting unit 7, a rotational speed estimation value calculating unit 8 which serves as a rotational speed calculating unit, a primary frequency instruction calculating unit 9, a d-axis current control unit 10, a q-axis current control unit 11, a phase calculating unit 12, a voltage instruction calculating unit 13, a coordinate converter 14, an electric power converter 15, a coordinate converting unit 17 for outputting two-phase direct currents IdFb and IqFB, and a rotational speed controlling unit 19. Each of units is provided by a CPU, a ROM, a RAM, and a program stored in a storage medium or may be provided by discrete circuits.

In this system, the rotational speed of the induction motor 16 is controlled through a sensor-less vector control method. Hereinafter, will be described the sensor-less vector control method. In the vector control method, a magnetic flux axis of the induction motor is defined as a d axis and an axis electrically perpendicular to the d axis is defined as a q axis.

The rotational speed instruction value calculating unit 1 is supplied with a rotation instruction (a rotational frequency instruction) and outputs a rotational speed instruction value ωra* which serves as a reference of the rotational speed of the induction motor 16. During acceleration, the rotational speed instruction ωra* varies at a time variation rate (acceleration rate) initially set as time elapses. The exciting current instruction calculating unit 2 is supplied with an exciting current setting, and calculates an exciting current instruction Id* from the exciting current setting.

The rotational speed estimation value calculating unit 8 calculates a rotational speed estimation value ωr^ on the basis of the q-axis current Iq and the like calculated on the basis of the IqFB outputted by the coordinate converting unit 17.

$$\omega r\hat{} = 1/(1+T1 \cdot s) \cdot (L2^*/M^*) \cdot (1/\phi 2d^*) \cdot (r1^* \cdot Iq^* + \omega 1^* \cdot (M^*/L2^*) \cdot \phi 2d^* + \Delta Vq - (r1^*+r2'^*+L\sigma^* \cdot s) \cdot Iq)$$

The rotational speed controlling unit 19 supplied with a value derived by subtracting the rotational speed estimation value ωr^ from the rotational speed instruction ωra*, calculates the torque current instruction Iq* so as to equalize the rotational speed estimation value ωr^ to the rotational speed instruction ωr*. The d-axis current control unit 10 calculates the d-axis voltage correction value Δd so as to equalize the Id detection value (IdFB) to Id*. The q-axis controlling unit 11 calculates the q-axis voltage correction value Δq so as to equalize the Iq detection value (IqFB) to Iq*.

The primary frequency instruction calculating unit 9 calculates the primary frequency ω1* to be applied to the induction motor 16 by adding the rotational speed estimation value ωr^ to the rotational speed instruction value ωr*. The phase calculating unit 12 calculates the phase instruction θ* by integrating the primary frequency ω1*.

The voltage instruction calculating unit 13 calculates the d-axis voltage instruction Vd* and the q-axis voltage instruction Vq* from the primary frequency ω1*, the d-axis voltage correction value Δd from the d-axis current control unit 10, the q-axis voltage correction value Δq from the q-axis current control unit 11 as shown in Eqs. (2) and (3).

$$Vd^* = r1^* \cdot Id^* - \omega 1^* \cdot L\sigma^* \cdot Iq^* + \Delta d \quad (2)$$

$$Vq^* = r1^* \cdot Iq^* + \omega 1^* \cdot L\sigma^* \cdot Id^* + \omega 1^* \cdot (M^*/L2^*) \cdot \phi 2d^* + \Delta q \quad (3)$$

where $r1^*$, $L\sigma^*$, $M^*$, $L2^*$, and $\phi 2d^*$ are a primary resistance setting value, a (primary+secondary) leak inductance setting value, a mutual inductance setting value, a secondary inductance setting value, and a secondary d-axis magnetic flex instruction value, respectively. In the equation, Δd and Δq represent outputs of the d-axis current control unit 10 and the q-axis current control unit 11.

The coordinate converter 14 effects a coordinate conversion to generate the three-phase ac voltage instructions Vu, Vv, and Vw, which are PWM-controlled, from the d-axis voltage instruction Vd*, the q-axis voltage instruction Vq*, and θ*.

The coordinate converting unit 17 converts an ac current detection values from the current detecting unit 18 into the two-phase direct currents IdFB and IqFB with phase instruction θ*. As described above, in the vector control method, currents and voltages are so controlled that the actual rotational speed tracks a predetermined rotational instruction value ωr*.

The slip frequency estimation value calculating unit 3 is supplied with the d-axis voltage correction value Δd, the q-axis voltage correction value Δq, and the primary frequency ω1* and effects an estimation calculation to obtain a slip frequency estimation value ωs^ of the induction motor 16 from the d-axis voltage correction value Δd, the q-axis voltage correction value Δq and the primary frequency ω1*. For example, the slip frequency ωs is estimated as follows:

In the induction motor 16, there are relations represented by Eqs. (4) and (5). Constants without mark of * are actual values of the induction motor 16, and $\phi 2q$ is a secondary q-axis magnetic flux.

$$Vd = r1 \cdot Id - \omega 1 \cdot L\sigma \cdot Iq - \omega 1 \cdot (M/L2) \cdot \omega 2q \quad (4)$$

$$Vq = r1 \cdot Iq + \omega 1 \cdot L\sigma \cdot Id + \omega 1 \cdot (M/L2) \cdot \phi 2d \quad (5)$$

In the relations, a current control system controls currents to make Id=Id* and Iq=Iq*, and second terms in Eqs. (3) and (5) are so smaller than third terms in Eqs. (3) and (5), respectively, that they can be neglected. Further, it is assumed that $r1 \cdot \omega 1 \cdot M$ and L2 are the same as setting values, and generally, Vd*=Vd and Vq*=Vq. Then, the d-axis magnetic flux estimation value $\phi 2d\hat{}$ and a q-axis magnetic flux estimation value $\phi 2d\hat{}$ are given as shown in Eqs. (6) and (7).

$$\Phi 2d\hat{} = (\Delta q + \omega 1^* \cdot (M^*/L2^*) \cdot \Phi 2d^*)/(\omega 1^* L \cdot (M^*/L2^*)) \quad (6)$$

$$\Phi 2q\hat{} = -\Delta d/(\omega 1^* \cdot (M^*/L2^*)) \quad (7)$$

Using these equations, the slip frequency instruction $\omega s\hat{}$ is obtained as blow.

Generally, $\Phi 2q$ and $\Phi 2d$ satisfy Eqs. (8) and (9). T2 is a secondary time constant of the induction motor 16 and s is a differential operator.

$$\omega 2d = (M \cdot Id + \omega s \cdot T2 \cdot \Phi 2q)/(1 + T2 \cdot s) \quad (8)$$

$$\Phi 2q = (M \cdot Iq - \omega s \cdot T2 \cdot \Phi 2d)/(1 + T2 \cdot s) \quad (9)$$

Here, it is assumed that the d-axis current Id is controlled to be approximately a rated current (a current approximately twice a rated exciting current), and Iq=0, a stationary solution of $\omega s$ as shown in Eq. (10).

$$\omega s = -1/T2 \cdot \Phi 2q/\Phi 2d \quad (10)$$

Accordingly, $\omega s$ is calculated from Eqs. (6), (7), and (10) and is used as a slip frequency instruction $\omega s\hat{}$.

The torque $\tau m$ is given by Eq. (11). In Eq. (11), P is the number of magnetic poles of the induction motor 16.

$$\tau m = 3 \cdot (P/2) \cdot (M/L2) \cdot (\Phi 2d \cdot Iq - \Phi 2q \cdot Id) \quad (11)$$

The d-axis current Id is controlled to be larger than that in a normal condition and Iq=0 as mentioned above, the torque $\tau m$ is given by Eq. (12).

$$\tau m = 3 \cdot (P/2) \cdot (M/L2) \cdot (-\Phi 2q \cdot Id) \quad (12)$$

Because the d-axis current Id is constant, according to Eq. (12), a maximum torque is generated when $\Phi 2q$ is negative and has a maximum absolute value. Further, stationary solutions of $\Phi 2d$ and $\Phi 2q$ are obtained in Eqs. (8) and (9), and then Eqs. (13) and (14) are given.

$$\Phi 2d = M \cdot Id/(1+(\omega s \cdot T2)^2) \quad (13)$$

$$\Phi 2q = -\omega s \cdot T2 \cdot M \cdot Id/(1+(\omega s \cdot T2)^2) \quad (14)$$

Here it is assumed that a magnetic flux is given by $\gamma \cdot \Phi 0$ because the magnetic flux increases up to a magnetic saturation region because Id is controlled to have a value larger than the rated exciting current. Further, $\Phi 0$ represents a rated magnetic flux of the induction motor 16, and ranges from 1.1 to 1.3.

In this condition, $\Phi 2d$ and $\Phi 2q$ satisfy Eq. (15) and a relation represented in Eq. (16) is given.

$$\sqrt{(\Phi 2d^2 + \Phi 2q^2)} = \gamma \cdot \Phi 0 \quad (15)$$

$$M \cdot Id/\sqrt{(1+(\omega s \cdot T2)^2)} = \gamma \cdot \Phi 0 \quad (16)$$

From Eqs. (16) and (14), $\Phi 2q$ is given by Eq. (17).

$$\Phi 2q = -\omega s \cdot T2 \cdot \gamma \cdot \Phi 0/\sqrt{(1+(\omega s \cdot T2)^2)} \quad (17)$$

If the primary frequency $\omega 1$ is increased, and the d-axis current is increased over the rated value in lifting goods with the elevating system such as a crane, $\Phi 2q$ is given by Eq. (17) and monotonically increases regarding $\omega s$. However, when the primary frequency $\omega 1$ keeps increasing (equals to $\omega s$ from a stop status to a start of the induction motor), magnetic saturation disappears, and $\Phi 2q$ is given by Eq. (14).

Figure 2:
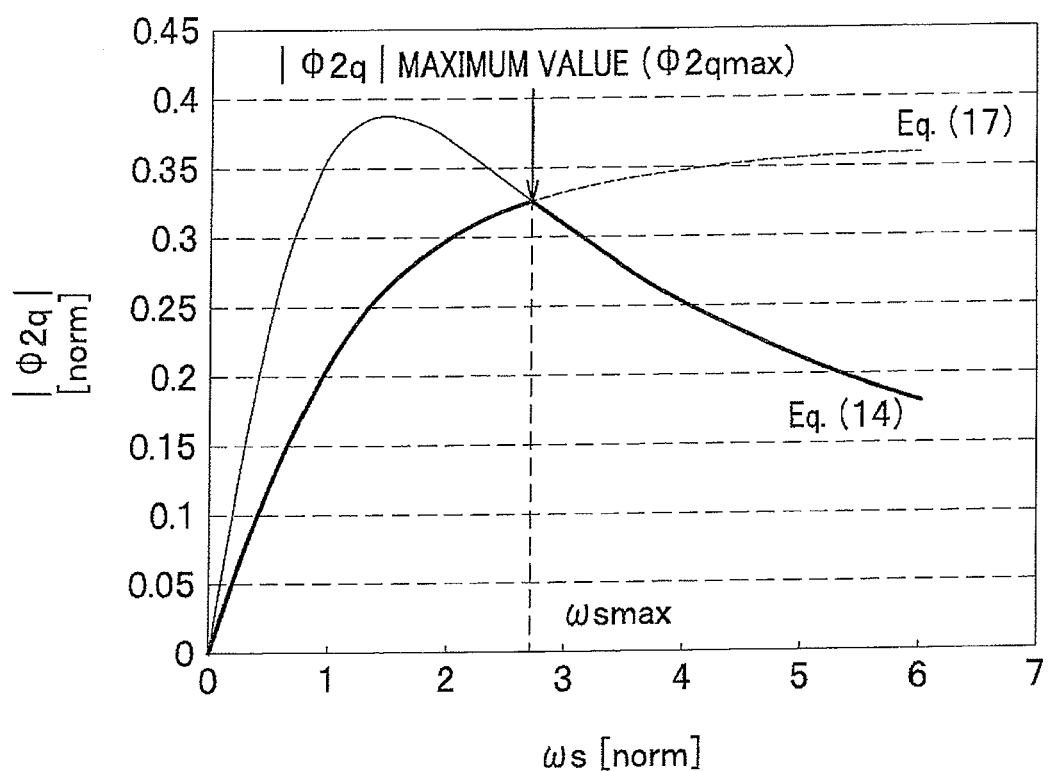
FIG. 2 is a chart for showing time variation in a q-axis magnetic flux according to the first embodiment of the present invention.

FIG. 2 shows absolute values (normalized by a predetermined value) regarding $\omega s$ (normalized by a predetermined value) on the axis of abscissa. At a point where a curve given by Eq. (14) intersects with that given Eq. (17), the magnetic saturation disappears and $\Phi 2q$, i.e., torque, has a maximum value. From Eq. (17), the slip frequency $\omega s$max providing the maximum value is given by Eq. (18), and the maximum torque $\tau m$max is give by Eq. (19). In Eq. (18), Id can be obtained with IdFB and Id*, and $\gamma$ is, for example, from 1.1 to 1.3.

$$\omega s \text{max} = \sqrt{((M \cdot Id/\gamma/\Phi 0)^2 - 1)/T2} \quad (18)$$

$$\tau m \text{max} = 3(P/2) \cdot (M/L2) \cdot \gamma \cdot \Phi 0 \cdot \sqrt{(Id^2 - (\gamma \cdot \Phi 0/M)^2)} \quad (19)$$

The maximum torque generating slip frequency calculating unit 4 is supplied with the d-axis voltage instruction Vd* or the Id detection value (IdFB) and calculates the slip frequency $\omega s$ for generating the maximum torque of the induction motor 16 with the Eq. (18). In other words, the maximum torque generating slip frequency calculating unit 4 calculates the slip frequency $\omega s$ on the basis of the d-axis voltage instruction Vd* or the currents detected by the current detecting unit 18. In a case where the d-axis current Id is controlled to be a predetermined value equal to or greater than the rated exciting current, and the q-axis current Iq is controlled to be constant at 0, a current value is always constant independently of a magnitude of the load. Here, "being constant" means "being constant within a range of magnitude of noise components detected by measurement.

Figure 3:
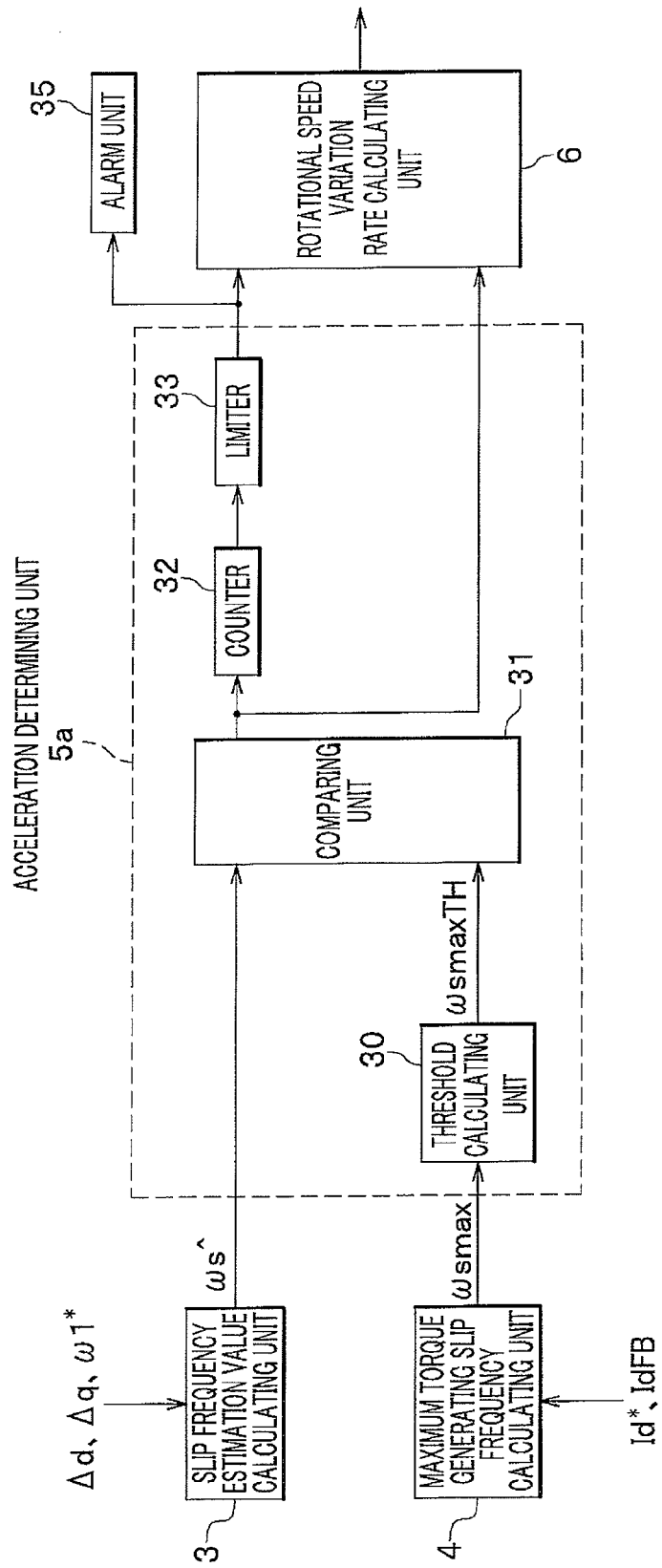
FIG. 3 is a block diagram of an acceleration determining unit with connection relations according to a second embodiment of the present invention.

The acceleration determining unit 5a shown in FIG. 3 is an embodiment of the acceleration determining unit 5 and includes a threshold calculating unit 30, a comparing unit 31, a counter 32, and a limiter 33.

The threshold calculation unit 30 calculates a threshold $\omega s$maxTH corresponding to the slip frequency $\omega s$max (for example, $\omega s$max is multiplied by $\alpha$ ($\alpha \leq 1$)). The comparing unit 31 compares $\omega s\hat{}$ with $\omega s$maxTH, and generates an output when $\omega s\hat{} > \omega s$maxTH. The counter 32 receives the output from the comparing unit 31 and measures time from the reception. The counter is reset when the comparing unit 31 outputs $\omega s\hat{} \leq \omega s$maxTH. More specifically, in the acceleration determining unit 5 a limiter 33 determines that lifting is impossible to generate an acceleration impossibility signal, when the condition of $\omega s\hat{} > \omega s$maxTH is kept and the output of the counter 32 exceeds a threshold.

The threshold in the limiter 33 is smaller than a secondary time constant of the induction motor 16 (for example, 0.15 sec) corresponding to a time interval for which variation in the slip frequency is reflected and greater than an operation period (for example, 0.0001 sec) of the controller. Further, in place of the counter 32, any time measurement unit such as an integrating circuit (not shown) can be used.

Further, the rotational speed variation rate calculating unit 6 receives the determination signal from the limiter 33 and generates an output thereof having a predetermined negative value as the rotational speed variation rate. In addition, the determination signal from the limiter 33 is applied to an alarm 35 to generate an alarm. The alarm is made using an electric signal, a sound, light, or vibrations. Further, a brake unit 116 can be used to forcibly stop rotation of the induction motor 16 simultaneously in response to a brake signal BRSIG.

Returning to FIG. 1, the rotational speed variation rate correcting unit 7 corrects the rotational speed instruction value $\omega ra^*$ input thereto in accordance with the output of the rotational speed variation rate calculating unit 6 to output the rotation instruction value $\omega r^*$. For example, the rotational speed variation rate correcting unit 7 corrects the rotational speed variation rate to a negative value side, and when the output of the rotational speed variation rate calculating unit 6 is negative, the induction motor 16 is decelerated.

When the determination signal from the limiter 33 (see FIG. 3) is absent, the rotational speed variation rate calculating unit 6 outputs a default value of the rotational speed variation rate value. Thus, the correction of the rotational speed variation rate for the rotational speed instruction value ωra* is not done in the rotational speed variation correcting unit 7.

As described above, according to the embodiment, the acceleration determining unit 5 detects the condition in which the slip frequency estimation value ωs^ exceeds the slip frequency ωsmaxTH for the predetermined time interval. When this is detected, the rotational speed variation rate calculating unit 6 corrects the variation rate of the rotational speed instruction value ωa* to the negative value side to decelerate the induction motor 16. More specifically, the elevating system can previously determine the condition in which acceleration in lifting is impossible without error, and thus can lift down the goods moderately and stably.

Further in the elevating system such as a crane, there is a case where goods having a given weight is lifted and moved to another place to be lifted down there, and another cargo having a different weight is lifted. In the case that a maximum load may be estimated, and in a case where an unexpected torque occurs, because loads on the induction motor 16 vary from one cargo to another, an acceleration rate is determined in accordance with the loads to avoid failure in acceleration. Determination is made on the basis of the maximum torque generating slip frequency, which provides a maximum lifting efficient.

Second Embodiment

Figure 4:
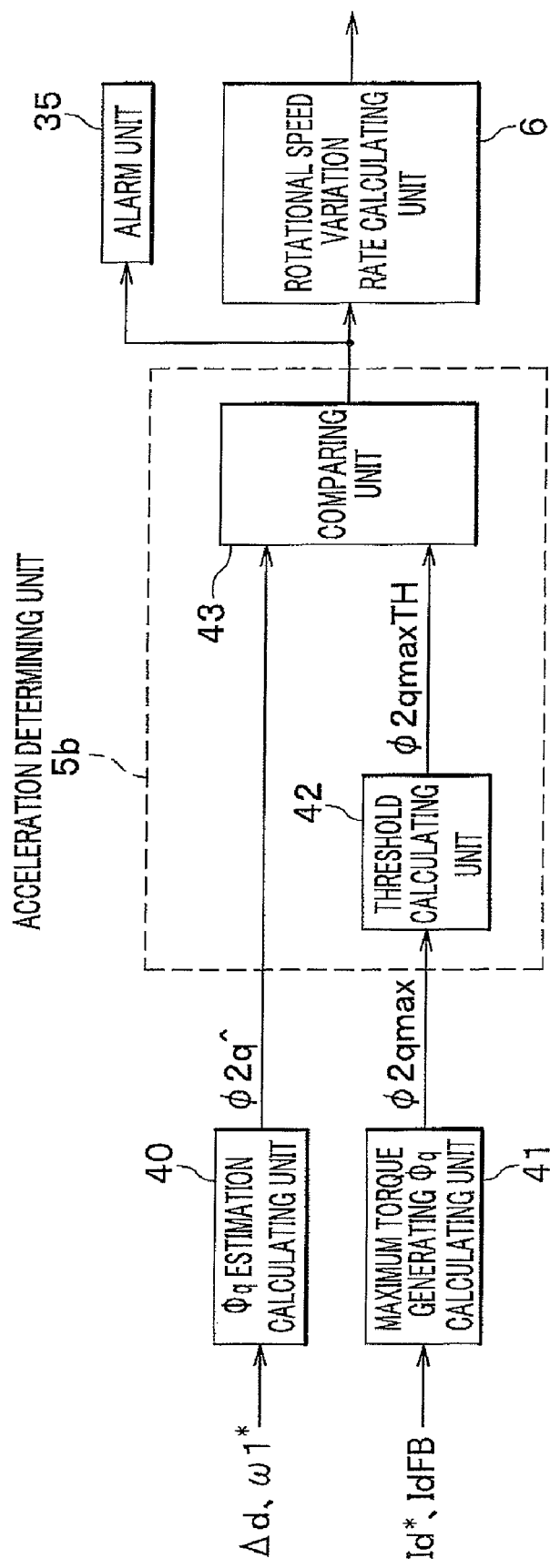
FIG. 4 is a block diagram of an acceleration determining unit with connection relations according to a third embodiment of the present invention.
Figure 5:
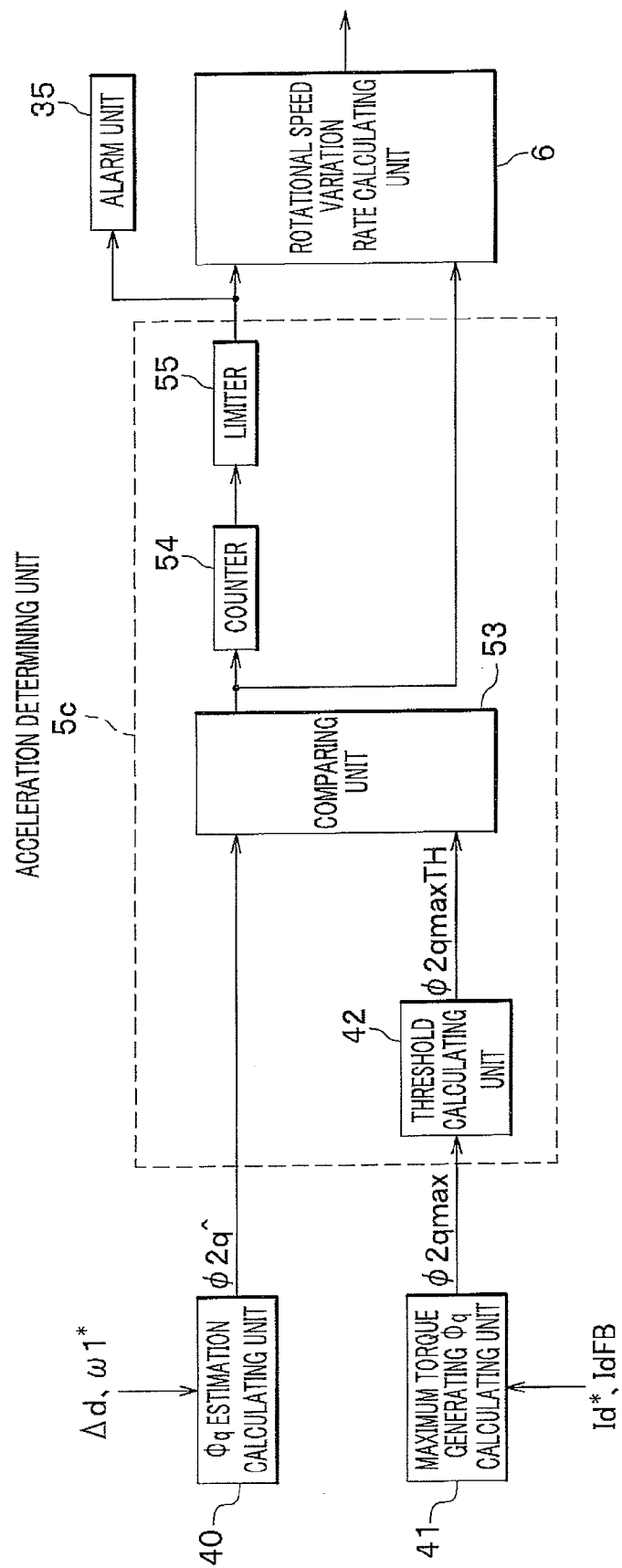
FIG. 5 is a block diagram of an acceleration determining unit with connection relations according to a fourth embodiment of the present invention.

In the first embodiment, generation of the maximum torque is detected on the basis of the slip frequency ωs. However, the determination that the slip frequency ωs exceeds ωs max can be made also on the basis of the secondary q-axis magnetic flux φ2q. As shown in FIG. 4, an acceleration determining unit 5b of the second embodiment corresponds to the acceleration determining unit 5a (see FIG. 1), includes a threshold calculating unit 42 and a comparing unit 43, and is supplied with an output signal of a φq estimation calculating unit 40 for calculating a q-axis magnetic flux and an output signal of a maximum torque generating φq calculating unit 41 for a maximum torque generating q-axis magnetic flux calculation.

The φq estimation calculating unit 40 calculates a q-axis magnetic flux estimation value φ2q^ corresponding to ωs^. The maximum torque generating φq calculating unit 41 calculates a q-axis magnetic flux φ2qmax corresponding to ωsmax. The threshold calculating unit 42 calculates a threshold φ2qmaxTH corresponding to the φ2qmax (for example, φ2qmax is multiplied by α (α≦1)). In this condition, φ2q^, φ2qmax, and φ2qmaxTH are negative. The comparing unit 43 determines that acceleration is impossible when φ2q^ is lower than the predetermined value of φ2qmaxTH and when an absolute value of φ2qmaxTH exceeds an absolute value of φ2q^ and outputs a determination signal. Like the first embodiment, the rotational speed variation rate calculating unit 6 decelerates the induction motor 16 in accordance with the determination signal outputted by the comparing unit 43, and the alarm unit 35 generates an alarm.

As described above, in this embodiment, an excessive slip is detected by the q-axis magnetic flux calculation value to prevent goods from falling like the first embodiment.

With reference to drawings will be described a third embodiment in which only parts different from the first and second embodiment will be described.

An acceleration determining unit 5c corresponds to the acceleration determining unit 5 (see FIG. 1), wherein the slip frequency estimation value calculating unit 3 is replaced with a φq estimation calculating unit 40, which is a q-axis magnetic flux calculating part, for calculating a q-axis magnetic flux estimation value φ2q^. In addition, the maximum torque generating slip frequency calculating unit 4 is replaced with a maximum torque generating φq calculating unit 41, which is a maximum torque generating q-axis magnetic flux calculating unit, for calculating a q-axis magnetic flux φ2qmax corresponding to ωsmax.

A comparing unit 53 outputs a comparing result signal when φ2q^ is smaller than an output φ2qmaxTH of the threshold calculating unit 42. A counter 54 outputs a time measurement signal indicating time interval from the reception of the comparing result signal. A limiter 55 compares the time measurement signal from the counter with a threshold value. When a value of the time measurement signal exceeds the threshold value, the limiter 55 determines that acceleration is impossible and outputs a acceleration impossibility signal. Like the first embodiment, the rotational speed variation rate calculating unit 6 effects deceleration in response to the acceleration impossibility signal.

As mentioned above, in this embodiment, an excessive slip is detected with the q-axis magnetic flux calculation value and predicts falling of goods from duration of the excessive slip condition to prevent the goods from falling without error detection.

Fourth Embodiment

In the first embodiment, duration of a condition that the slip estimation value ωs^ exceeds the slip frequency threshold ωsmaxTH for generating the maximum torque. However, the acceleration impossibility can be detected by integrating a difference signal between the slip frequency estimation value ωs^ and the slip frequency threshold ωsmaxTH for generating the maximum torque.

Figure 6:
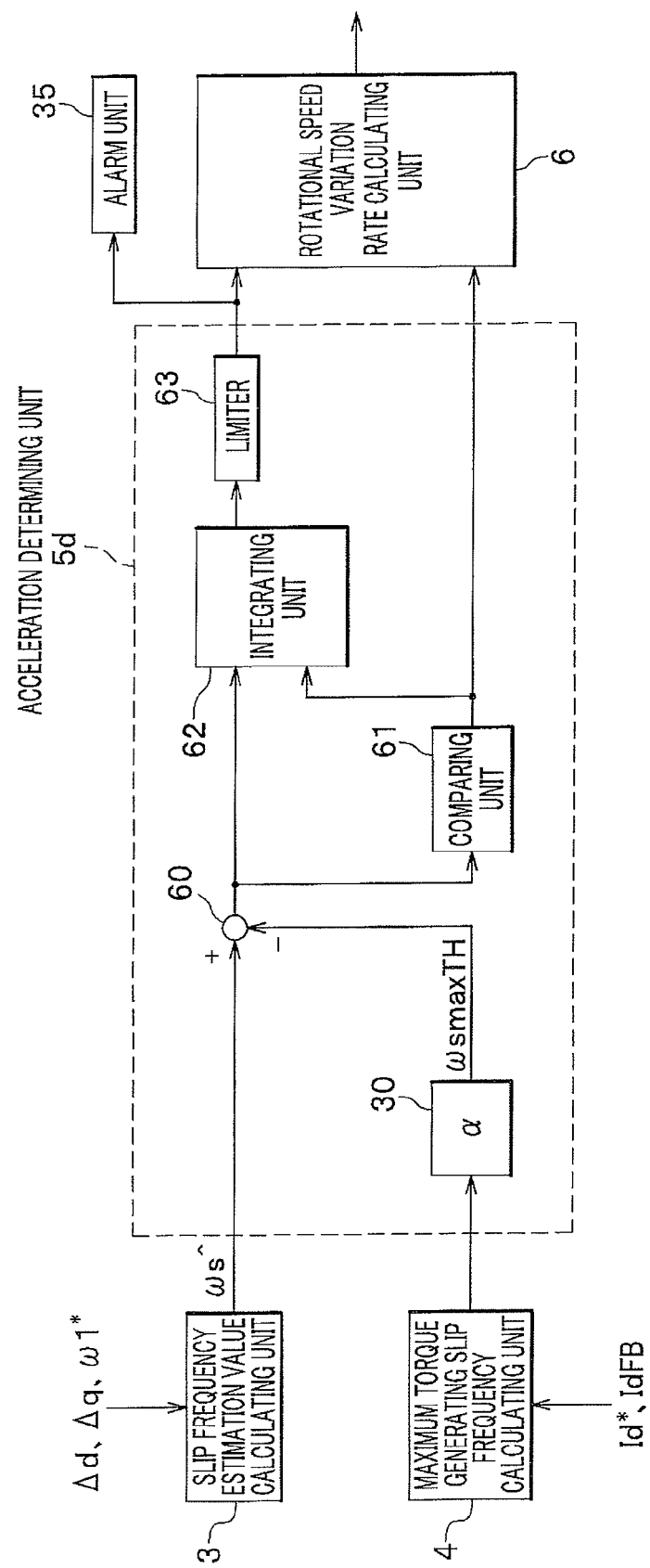
FIG. 6 is a block diagram of an acceleration determining unit with connection relations according to a fifth embodiment of the present invention.

An acceleration determining unit 5d shown in FIG. 6 corresponds to the acceleration determining unit 5 (see FIG. 1) and includes a threshold calculating unit 30, a subtracting unit 60, a comparing unit 61, an integrating unit 62, and a limiter 63.

The threshold calculating unit 30 outputs ωsmaxTH using a calculation result of the maximum torque generating slip frequency calculating unit 4. The subtracting unit 60 subtracts the slip frequency threshold ωsmaxTH from the slip frequency estimation value ωs^, which is an output signal of the slip frequency estimation value calculating unit 3. An output signal (ωs^−ωsmaxTH) of the subtracting unit 60 is applied to a comparing unit 61 and the integrating unit 62. The comparing unit 61 discriminates a magnitude relation between the slip frequency estimation value ωs^ and the slip frequency threshold ωsmaxTH from a polarity of the input signal of (ωs^−ωsmaxTH). In receiving the signal of ωs^>ωsmaxTH from the comparing unit 61, the integrating unit 62 calculates integration of (ωs^−ωsmaxTH) regarding time from that instant. The limiter 63 compares the input integration value with a predetermined threshold value. The limiter 63 compares the input integration value with a predetermined threshold value. When the input integration value exceeds the predetermined threshold value, the limiter 63 determines that acceleration is impossible and outputs an acceleration impossibility signal. The threshold of the limiter 63 is greater than a product of the controller operating period by one bit of frequency quantizing (for example, 0.00004 rad) and smaller than a product of a slip frequency amount corresponding to the rated torque in FIG. 2 by a motor secondary time constant (for example, 5 rad). Further, like the first embodiment, the rotational speed variation rate calculating unit 6 effects deceleration in accordance with the acceleration impossibility signal and the alarm unit 35 generates an alarm.

Figure 7:
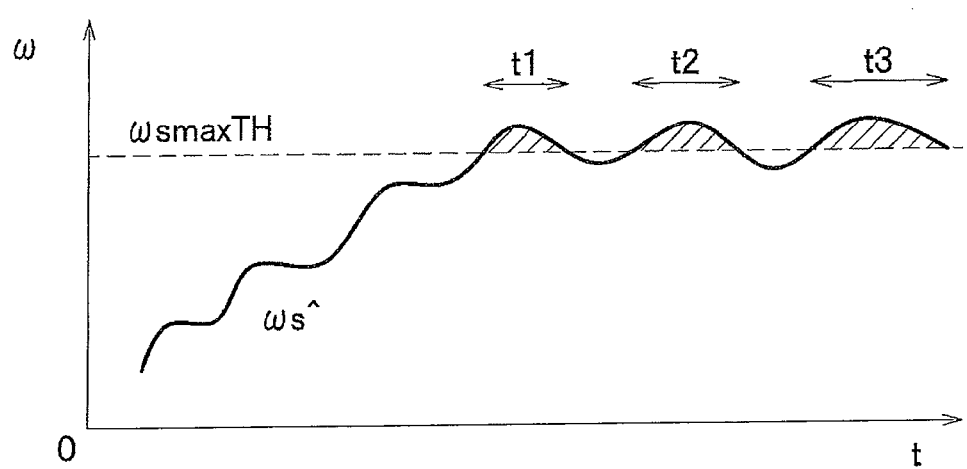
FIG. 7 is a chart for showing time variation in slip frequency according to the fifth embodiment.

As mentioned above, the acceleration impossibility is determined on the basis of both the magnitude and duration of the excessive slip. FIG. 7 shows a time variation of the slip frequency estimation $\omega s\hat{}$ with the slip frequency threshold $\omega smaxTH$. The frequency estimation value $\omega s\hat{}$ has random variation with repetition of increase and decrease and converges in $\omega smaxTH$ which is constant. The integrating unit 62 effects the time integration regarding timing t1, t2, t3, ... when $\omega s\hat{}$ is greater than $\omega smaxTH$. Thus, although a value of ($\omega s\hat{}-\omega smaxTH$) becomes negative, the time integration restarts when the value becomes positive. In contrast, in the acceleration determining unit 5 of the first embodiment, the counter 32 is reset when the value of ($\omega s\hat{}-\omega smaxTH$) temporarily becomes negative.

Fifth Embodiment

In the fourth embodiment, the slip frequency estimation value is integrated. However, the acceleration impossibility can be determined by integration result of the q-axis magnetic flux.

Figure 8:
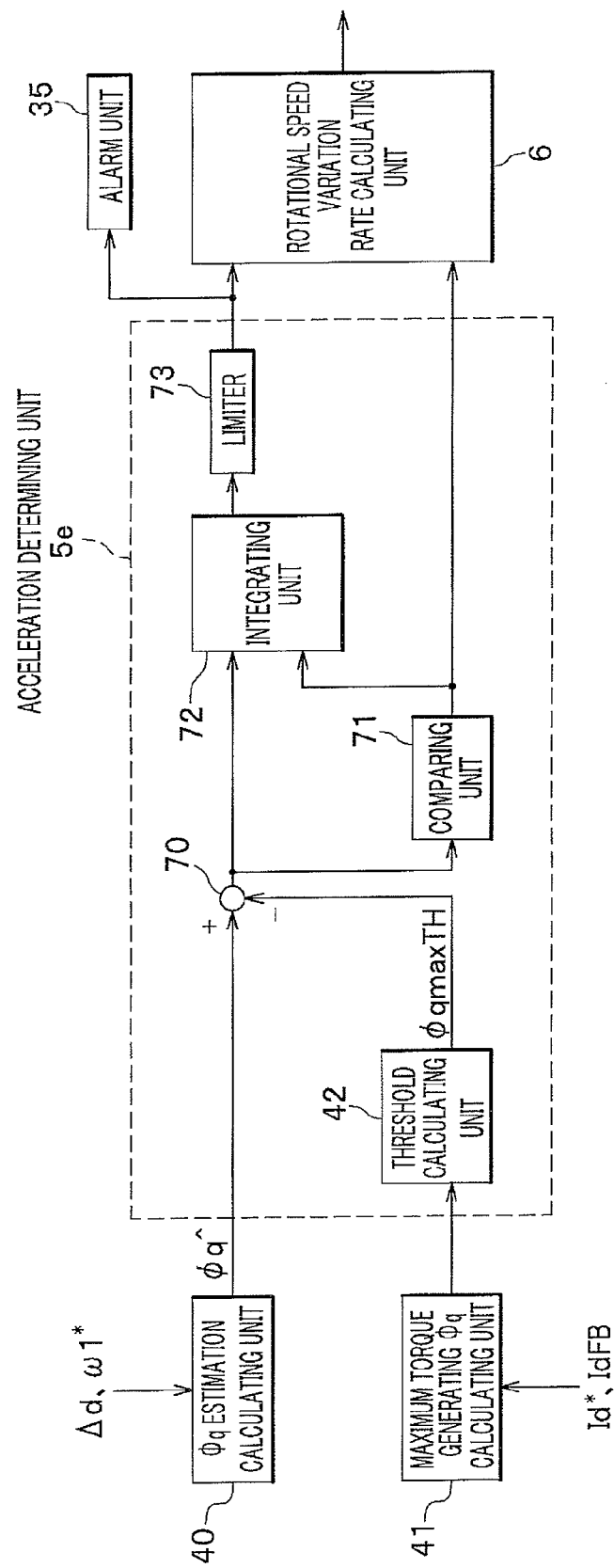
FIG. 8 is a block diagram of an acceleration determining unit with connection relations according to a sixth embodiment of the present invention.
Figure 9:
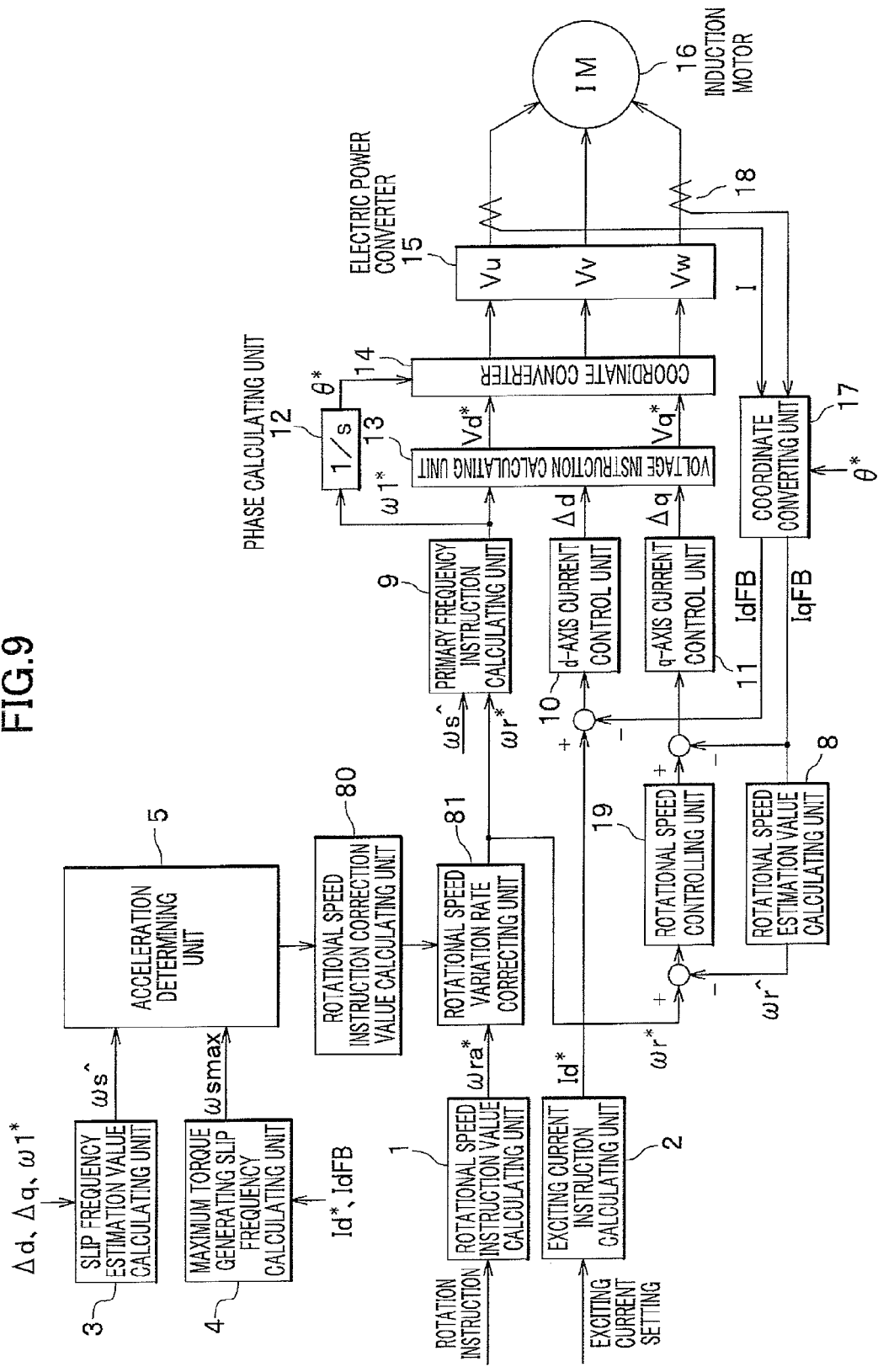
FIG. 9 is a block diagram of an induction motor drive system including an induction motor drive unit according to an eighth embodiment of the present invention.

The acceleration determining unit 5e in FIG. 8 corresponds to the acceleration determining unit 5 (see FIG. 1) and includes a threshold calculating unit 42, a subtracting unit 70, a comparing unit 71, an integrating unit 72, and a limiter 73.

The subtracting unit 70 outputs a signal of ($\phi q\hat{}-\phi qmaxTH$) which is applied to the comparing unit 71 and the integrating unit 72. The comparing unit 71 discriminates a magnitude relation between the q-axis magnetic flux estimation value $\phi q\hat{}$ and $\phi qmaxTH$ from a polarity of the input signal of $\phi q\hat{}-\phi qmaxTH$). When receiving the signal of $\phi q\hat{}<\phi qmaxTH$) from the comparing unit 71, the integrating unit 72 starts the time integration of the signal of ($\phi q\hat{}-\phi qmaxTH$) from that instance and applies the integration result to the limiter 73. When the input value exceeds a predetermined value, the limiter 73 determines the acceleration impossibility and outputs the acceleration impossibility signal. Like the first embodiment, the rotational speed variation rate calculating unit 6 effects deceleration, and the alarm unit 35 generates an alarm.

The threshold of the limiter 73 is greater than a product of the controller operating period by the one bit of the frequency quantizing.

As described above, according to the embodiment, the acceleration determining unit 5e detects an excessive slip with the q-axis magnetic flux calculating value and determines the acceleration impossibility in consideration of both the magnitude of the excessive slip and duration, which more accurately prevent goods from falling.

Sixth Embodiment

Figure 12:
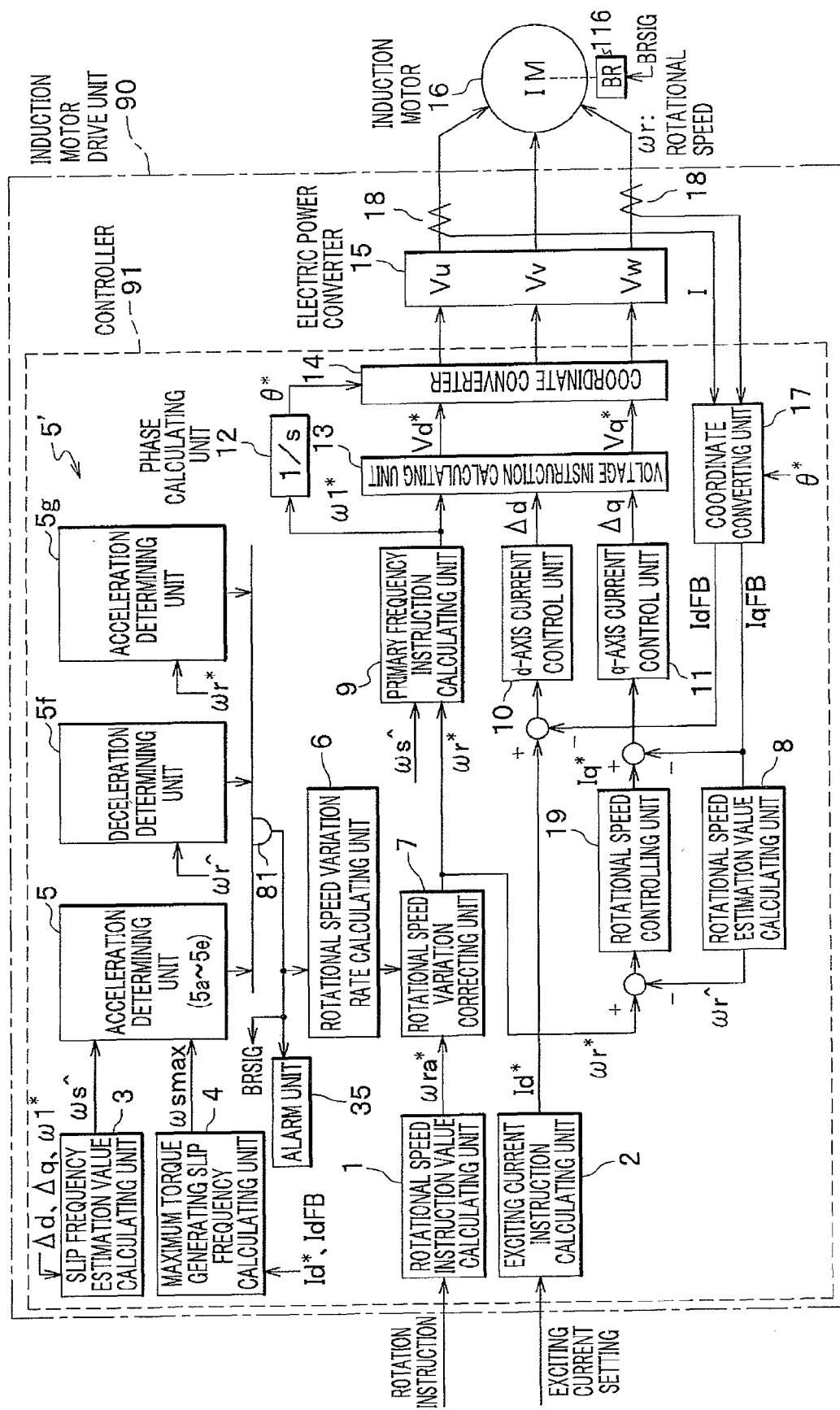
FIG. 12 is a block diagram of an induction motor drive system including an induction motor drive unit according to a sixth embodiment of the present invention.

FIG. 12 shows a sixth embodiment. In the above-described embodiments, the acceleration impossibility is determined and generation of the alarm is detected only by the acceleration determining unit 5. However, it is possible to add conditions to the condition determined by the acceleration determining unit 5. More specifically, a deceleration determining unit 5f and an acceleration determining unit 5g are further provided.

More specifically, the acceleration impossibility is determined from three conditions. The first condition is determined by the acceleration determining unit 5 (5a to 5e) described from the first to fifth embodiments. The second condition is determined by the deceleration determining unit 5f, which outputs a deceleration detection signal when the rotational speed estimation value $\omega r\hat{}$ outputted by the rotational speed estimation calculating unit 8 is under a predetermined value (for example, 0). The third condition is detected by another acceleration determining unit 5g which determines an accelerating instructing condition when the variation amount of the rotational speed instruction value $\omega r^*$ is greater than 0.

All of the acceleration determining unit 5, the deceleration determining unit 5f, and the another acceleration determining unit 5g detect the above-mentioned conditions, respectively, a final acceleration impossibility is determined by an AND gate 81.

A fourth condition may be further judged that a torque is insufficient when the torque is insufficient by a torque insufficiency determining unit (see FIG. 13) which outputs a torque insufficiency signal. The final acceleration impossibility in this case is determined from the first to fourth conditions similarly by the AND gate 81. The estimation rotational speed variation rate is obtained by differentiating, for example, the estimation rotational speed.

As mentioned above, in this embodiment, during acceleration, it is detected that the slip frequency becomes large, and thus, the induction motor cannot generate a sufficient torque with deceleration of the induction motor 16 or with a reverse rotation. In detecting this, the deceleration control and generating the alarm are effected rapidly.

Seventh Embodiment

Figure 13:
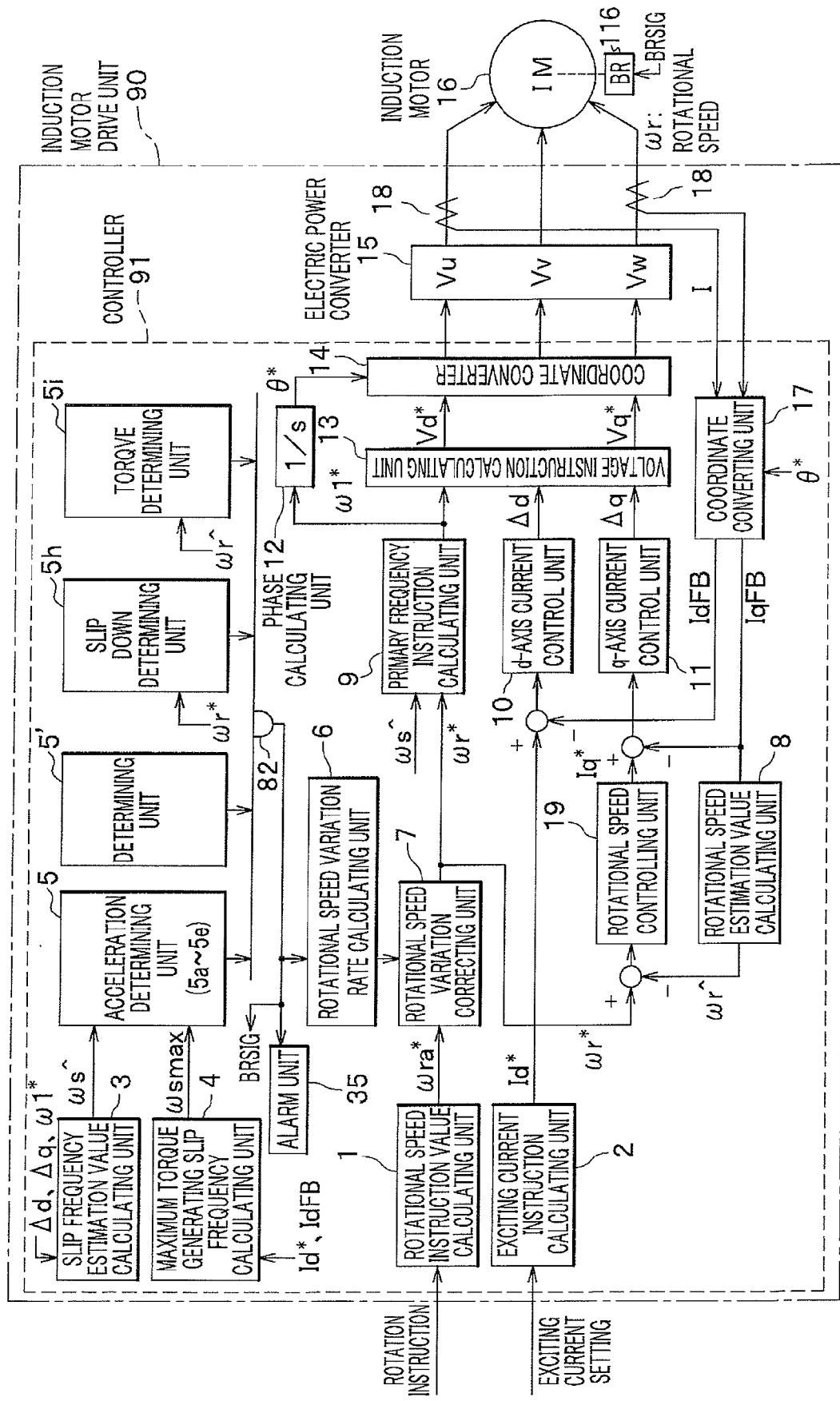
FIG. 13 is a block diagram of an induction motor drive system including an induction motor drive unit according to a seventh embodiment of the present invention.

A seventh embodiment will be described with reference to FIG. 13. In FIG. 13, an estimation position calculating unit 5h for estimating a current position of goods and a slip down determining unit 5i are further provided. The slip down determining unit 5h determines the presence and absence of slip down when the position estimated from the rotational speed estimation value $\omega r\hat{}$ outputted by the estimation position calculating unit 8 exceeds a first predetermined value, and after that, falls below a second predetermined value, and outputs a slip down determining signal. The final acceleration impossibility is determined from three determination results, namely, the acceleration determination from the acceleration determining unit 5 (5a to 5e), determination from determination unit 5' (also shown in FIG. 12) including the deceleration determining unit 5f and the acceleration determining unit 5g, and the presence and absence of slip down detected by the slip down determining unit 5h.

In addition to the three determination results, a fourth determination result may be considered with a torque determining unit 5i which determines whether an estimation rotational speed variation rate falls down a predetermined value. The torque determining unit 5i determines insufficiency in torque when the estimation rotational speed variation rate is lower than the predetermined value and outputs an insufficient torque signal. The final acceleration impossibility is determined from the first to fourth conditions similarly by an AND gate 82. In this structure, the estimation rotational speed variation rate is obtained, for example, by integrating the rotational speed estimation value $\omega r\hat{}$.

Thus, it can be determined that the goods are lifted down from an original position. For example, lift-down is detected before collision of the goods with the ground, and the induction motor 16 is controlled to moderately lift down the goods. Further, it can be controlled to prevent the goods from ascending over a predetermined value.

Eighth Embodiment

In an eighth embodiment, the rotational speed variation rate calculating unit 6 and the rotational speed variation rate correcting unit 7 in the first embodiment are replaced with a rotational speed instruction correction value calculating unit 80 and a rotational speed variation rate correcting unit 81, respectively. When receiving the acceleration impossibility signal from the accelerating determining unit 5, the rotational speed instruction correction value calculating unit 80 outputs a predetermined rotational speed correction value $\Delta\omega r^* < 0$. The rotational speed variation rate correcting unit 81 corrects the rotational speed instruction value $\omega r^*$ with the rotational speed correction value $\Delta\omega r^*$. The rotational speed correction value $\Delta\omega r^*$ is, for example, a value obtained by multiplying a (negative) difference of ($\omega smaxTH - \omega s\hat{\ }$) by a proportional gain or calculated to generate a fixed deceleration rate capable of adequately lifting down the goods after correction.

According to the eighth embodiment, the goods are adequately lifted down in addition to the operation provided by the first to seventh embodiments.

Ninth Embodiment

FIG. 11 shows an elevating system according to a ninth embodiment of the present invention, which system using any of the induction motor drive systems in the first to eighth embodiments of the present invention. The elevating system 200 includes the induction motor drive unit 90, and the induction motor 16 driven by the induction motor drive unit 90, and an elevating unit 100 such as a crane which lifts and lift down the goods.

Particularly, the elevating system 200 using the induction motor drive unit according to the seventh embodiment, it can be determined that the goods are lifted down from an original position. For example, lift-down is detected before collision of the goods with the ground, and the induction motor 16 is controlled to moderately lift down the goods.

FIG. 10 is a block diagram for showing an ac power source connection for the first to ninth embodiments of the present invention.

The induction motor drive unit 90 in the above-described embodiments operates with a three-phase ac power source 92 having, for example, 200 V or 400 V, and includes an ac-dc converter 94 for converting an ac power into a dc power, a smoothing capacitor 95 to supply a dc power to the electric power converter 15, and the controller 91 for supplying three phase signal to control the rotation of the induction motor 16 with the acceleration impossibility determination.

MODIFICATION

The present invention is not limited to the above-described embodiments, but may be modified as follows:
(1) The slip frequency estimation value calculating unit 3 estimates the slip frequency $\omega s$ using Eq. (10). However, the slip frequency $\omega s\hat{\ }$ can be calculated also by subtracting the rotational speed estimation value $\omega r\hat{\ }$ from the primary frequency instruction $\omega 1^*$.
(2) In the above-described embodiments, the slip frequency is estimated. However, the slip frequency can be calculated using a rotational speed sensor.

In the above-mentioned embodiments, the induction motor drive unit, the rotational speed is estimated from the currents. The rotational speed instruction value is converted into a q-axis current instruction value in a rotational magnetic field coordinate system of the induction motor 16. The drive circuit (controller 91 except the slip frequency calculating unit 3, the maximum torque generating slip frequency calculating unit 4, the acceleration impossibility determining unit 5, the rotational speed variation rate calculating unit 6, the rotational speed variation correcting unit 7, and the alarm 35) effects the d-q vector controls to three-phase currents for the induction motor in accordance with a d-axis current instruction value in the rotational magnetic field coordinate system and the q-axis current instruction value and increases the d-axis current instruction value more than a normal value (rated exciting current) when either of the rotational speed instruction value or the estimated rotational speed is equal to or smaller than a predetermined value.

As mentioned above, there is provided the induction motor drive unit according to the first embodiment and the like. In the induction motor drive unit, the electric power converter 15 drives an induction motor. The current detector 18 detects currents in the induction motor. A drive circuit in the controller 91 generates drive signals supplied to the electric power converter 15 in response to a rotation instruction (rotational frequency instruction) and the currents detected by the current detector 18. The slip frequency calculating unit 3 calculates the slip frequency of the induction motor from the currents and the rotational frequency instruction as the slip frequency instruction $\omega s\hat{\ }$. The maximum torque generating slip frequency calculating unit 4 calculates a maximum torque generating slip frequency $\omega smax$ for generating a maximum torque of the induction motor 16 from a value regarding the currents detected by the current detector 18. The acceleration impossibility determining unit 5 determines that acceleration of the induction motor is impossible when the slip frequency $\omega s\hat{\ }$ exceeds the maximum torque generating slip frequency $\omega smax$ for the predetermined time interval to generate an acceleration impossibility signal. The value regarding the currents is of either the currents detected by the current detector 18 or a current instruction supplied to the drive circuit to determine a d-axis current for the induction motor.

Further, there is provided the induction motor drive unit to generate the acceleration impossibility signal according to the second embodiment and the like. In the induction motor drive unit, an electric power converter 15 drives the induction motor 16. The current detector 18 detects currents in the induction motor 16. The drive circuit in the controller 91 generates the drive signal supplied to the electric power converter 15 in response to a rotational frequency instruction and the currents. The q-axis magnetic flux calculating unit for calculating a q-axis magnetic flux of the induction motor from the currents and the rotational frequency instruction. The maximum torque generating q-axis magnetic flux calculating unit 4 calculates the maximum torque generating q-axis magnetic flux for generating a maximum torque of the induction motor from a value regarding the currents. The acceleration impossibility determining unit 5 determines that acceleration of the induction motor is impossible when the q-axis magnetic flux exceeds the maximum torque generating q-axis magnetic flux $\phi 2q\hat{\ }$ corresponding to $\omega s\hat{\ }$ to generate an acceleration impossibility signal.

As mentioned above, according to the first and second embodiments and the like, there is provided an induction motor drive unit. In the induction motor drive unit, the electric power converter 15 drives the induction motor 16. The current detector 18 detects in the induction motor 16. The drive circuit in the controller 91 generates the drive signal supplied to the electric power converter 15 in response to a rotational frequency instruction and the currents detected by the current detector 18. The variable detecting unit 3 and 40 detects a variable ($\square s$, $\square 2q$) of the induction motor 16 regarding a torque generated by the induction motor 16 from the currents and the rotational frequency instruction. The maximum torque generating value calculating unit 4 and 41 calculates a maximum torque generating threshold ($\square$smaxTH, $\square$qmaxTH) regarding the variable for generating a maximum torque of the induction motor from a value regarding the currents. The acceleration impossibility determining unit 5, 5a, 5b, 5c, and 5d determines that acceleration of the induction motor is impossible when the variable exceeds the maximum torque generating threshold to generate an acceleration impossibility signal.

The invention claimed is:

1. An induction motor drive unit comprising:
   an electric power converter for driving an induction motor;
   a current detector for detecting currents in the induction motor;
   a drive circuit for generating a drive signal supplied to the electric power converter in response to a rotational frequency instruction and the currents;
   a slip frequency calculating unit for calculating a slip frequency of the induction motor from the currents and the rotational frequency instruction;
   a maximum torque generating slip frequency calculating unit for calculating a maximum torque generating slip frequency for generating a maximum torque of the induction motor from a value regarding the currents; and
   an acceleration impossibility determining unit for determining that acceleration of the induction motor is impossible when the slip frequency exceeds the maximum torque generating slip frequency for the predetermined time interval to generate an acceleration impossibility signal.

2. The induction motor drive unit as claimed in claim 1, further comprising at least one of:
   a rotational speed correcting unit for correcting the rotational seed instruction so as to decelerate the induction motor in response to the acceleration impossibility signal;
   an alarming unit for generating an alarm in response to the acceleration impossibility signal; and
   a brake for braking the induction motor in response to the acceleration impossibility signal.

3. The induction motor drive unit as claimed in claim 1, further comprising:
   a rotational speed estimation unit for estimating a rotational speed of the induction motor from the currents, wherein the acceleration impossibility determining unit further determines that the acceleration of the induction motor is impossible when the estimated rotational speed is lower than a predetermined value.

4. The induction motor drive unit as claimed in claim 1, further comprising a rotational speed variation rate calculating unit for calculating a rotational speed variation rate of the induction motor, wherein the acceleration impossibility determining unit further determines that the acceleration of the induction motor is impossible when the rotational speed variation rate is negative.

5. The induction motor drive unit as claimed in claim 1, further comprising:
   a rotational speed estimation unit for estimating a rotational speed from the currents and
   a converting unit for converting rotational speed instruction value into a q-axis current instruction value in a rotational magnetic field coordinate system of the induction motor, wherein the drive circuit d-q vector controls three-phase currents for the induction motor in accordance with a d-axis current instruction value in the rotational magnetic field coordinate system and the q-axis current instruction value and increases the d-axis current instruction value more than a rated exciting current value when either of the rotational speed instruction value or the estimated rotational speed is equal to or smaller than a predetermined value.

6. An induction motor drive system comprising:
   an induction motor; and
   the induction motor drive unit as claimed in claim 1, wherein the electric power converter is driven by a three-phase ac power source.

7. An elevating system comprising:
   the induction motor drive unit as claimed in claim 1;
   an induction motor driven by the electric power converter; and
   an elevating unit driven by the induction motor.

8. The induction motor drive unit as claimed in claim 1, wherein the value is of either the currents or a current instruction supplied to the drive circuit to determine a d-axis current for the induction motor.

9. An induction motor drive unit comprising:
   an electric power converter for driving an induction motor;
   a current detector for detecting currents in the induction motor;
   a drive circuit for generating a drive signal supplied to the electric power converter in response to a rotational frequency instruction and the currents;
   a slip frequency calculating unit for calculating a slip frequency of the induction motor from the currents and the rotational frequency instruction;
   a maximum torque generating slip frequency calculating unit for calculating a maximum torque generating slip frequency for generating a maximum torque of the induction motor from a value regarding the currents;
   an integrating unit for obtaining a difference frequency between the maximum torque generating slip frequency and the slip frequency and time-integrating the difference frequency for time interval while the maximum torque generating slip frequency exceeds the slip frequency; and
   an acceleration impossibility determining unit for determining that acceleration of the induction motor is impossible when the integrating result of the integrating unit exceeds the predetermined value to generate an acceleration impossibility signal.

10. An induction motor drive unit comprising:
    an electric power converter for driving an induction motor;
    a current detector for detecting currents in the induction motor;
    a drive circuit for generating a drive signal supplied to the electric power converter in response to a rotational frequency instruction and the currents;
    a q-axis magnetic flux calculating unit for calculating a q-axis magnetic flux of the induction motor from the currents and the rotational frequency instruction;
    a maximum torque generating q-axis magnetic flux calculating unit for calculating a maximum torque generating q-axis magnetic flux for generating a maximum torque of the induction motor from a value regarding the currents; and
    an acceleration impossibility determining unit for determining that acceleration of the induction motor is impossible when the q-axis magnetic flux exceeds the maximum torque generating q-axis magnetic flux to generate an acceleration impossibility signal.

11. An induction motor drive unit comprising:
    an electric power converter for driving an induction motor;
    a current detector for detecting currents in the induction motor;

a drive circuit for generating a drive signal supplied to the electric power converter in response to a rotational frequency instruction and the currents;

a q-axis magnetic flux calculating unit for calculating a q-axis magnetic flux of the induction motor from the currents and the rotational frequency instruction;

a maximum torque generating q-axis magnetic flux calculating unit for calculating a maximum torque generating q-axis magnetic flux for generating a maximum torque of the induction motor from a value regarding the currents; and an acceleration impossibility determining unit for determining that acceleration of the induction motor is impossible when the q-axis magnetic flux exceeds the maximum torque generating q-axis magnetic flux for a predetermined time interval to generate an acceleration impossibility signal.

12. An induction motor drive unit comprising:

an electric power converter for driving an induction motor;

a current detector for detecting currents in the induction motor;

a drive circuit for generating a drive signal supplied to the electric power converter in response to a rotational frequency instruction and the currents;

a q-axis magnetic flux calculating unit for calculating a q-axis magnetic flux of the induction motor from the currents and the rotational frequency instruction;

a maximum torque generating q-axis magnetic flux calculating unit for calculating a maximum torque generating q-axis magnetic flux for generating a maximum torque of the induction motor from a value regarding the currents;

an integrating unit for obtaining a difference magnetic flux between the maximum torque generating q-axis magnetic flux and time-integrating the difference magnetic flux while the q-axis magnetic flux exceeds the maximum torque generating q-axis magnetic flux; and an acceleration impossibility determining unit for determining that acceleration of the induction motor is impossible when the integrated difference magnetic flux exceeds the predetermined value to generate a acceleration impossibility signal.

13. An induction motor drive unit comprising:

an electric power converter for driving an induction motor;

a current detector for detecting currents in the induction motor;

a drive circuit for generating a drive signal supplied to the electric power converter in response to a rotation instruction and the currents;

a variable detecting unit for detecting a variable of the induction motor regarding a torque generated by the induction motor from the currents and the rotational frequency instruction;

a maximum torque generating value calculating unit for calculating a maximum torque generating threshold regarding the variable for generating a maximum torque of the induction motor from a value regarding the currents; and an acceleration impossibility determining unit for determining that acceleration of the induction motor is impossible when the variable exceeds the maximum torque generating threshold to generate an acceleration impossibility signal.

* * * * *